United States Patent [19]
Kelley et al.

[11] Patent Number: 5,606,650
[45] Date of Patent: Feb. 25, 1997

[54] METHOD AND APPARATUS FOR STORAGE AND RETRIEVAL OF A TEXTURE MAP IN A GRAPHICS DISPLAY SYSTEM

[75] Inventors: Michael W. Kelley, San Mateo; Stephanie L. Winner, Santa Clara, both of Calif.

[73] Assignee: Apple Computer, Inc., Cupertino, Calif.

[21] Appl. No.: 477,276

[22] Filed: Jun. 7, 1995

Related U.S. Application Data

[63] Continuation of Ser. No. 51,471, Apr. 22, 1993.

[51] Int. Cl.$^6$ .................................................. G06T 11/40
[52] U.S. Cl. .......................... 395/130; 395/128; 395/515
[58] Field of Search .................................... 395/130, 164, 395/166, 128

[56] References Cited

U.S. PATENT DOCUMENTS

| | | | |
|---|---|---|---|
| 4,594,673 | 6/1986 | Holly | 395/121 |
| 4,615,013 | 9/1986 | Yan et al. | 395/130 |
| 4,658,247 | 4/1987 | Gharachorloo | 345/196 |
| 4,697,178 | 9/1987 | Heckel | 395/122 |
| 4,803,621 | 2/1989 | Kelly | 395/400 |
| 4,815,009 | 3/1989 | Blatin | 395/129 |
| 4,866,637 | 9/1989 | Gonzalez-Lopez et al. | 395/126 |
| 4,885,703 | 12/1989 | Deering | 395/122 |
| 4,897,803 | 1/1990 | Calarco et al. | 395/516 |
| 4,899,292 | 2/1990 | Montagna et al. | 395/147 |
| 4,945,500 | 7/1990 | Deering | 395/122 |
| 5,001,651 | 3/1991 | Rehme et al. | 395/126 |
| 5,097,427 | 3/1992 | Lathrop et al. | 395/130 |
| 5,115,402 | 5/1992 | Matsushiro et al. | 395/141 |
| 5,123,085 | 6/1992 | Wells et al. | 395/121 |
| 5,128,872 | 7/1992 | Malachowsky et al. | 395/513 |

(List continued on next page.)

OTHER PUBLICATIONS

"Computer Graphics Principles and Practice Second Edition", by Foley, Van Dam, Feiner and Huges, published by the Addision Wesley Publishing Corp., pp. 885–886 and pp. 899–900.

Fuchs, Henry, et al. "Pixel–Planes 5: A Heterogeneous Multiprocessor Graphics System Using Processor–Enhanced Memories," Computer Graphics, vol. 23, No. 3, pp. 79–88 (Jul. 1989).

Akeley, Kurt, et al., "High–Performance Polygon Rendering," Computer Graphics, vol. 22, No. 4, pp. 239–246 (Aug. 1988).

Deering, Michael, et al., "The Triangle Processor and Normal Vector Shader: A VLSI System for High Performance Graphics," Computer Graphics, vol. 22, No. 4, pp. 21–30 (Aug. 1988).

Kirk, David, et al., "The Rendering Architecture of the DN10000VS," Computer Graphics, vol. 24, No. 4, pp. 299–307 (Aug. 1990).

Williams, Lance, "Pyramidal Parametrics," Computer Graphics, vol. 17, No. 3, pp. 1–11 (Jul. 1983).

Oka, Masaaki, et al., "Real–Time Manipulation of Texture–Mapped Surfaces," Computer Graphics, vol. 21, No. 4, pp. 181–188 (Jul. 1987).

Stone "Microcomputer Interfacing", Addison–Wesley Publishing company, 1982 pp. 6–11.

*Primary Examiner*—Mark K. Zimmerman
*Attorney, Agent, or Firm*—Blakely, Sokoloff, Taylor & Zafman

[57] ABSTRACT

A method and apparatus for simultaneous retrieval of multiple pixels from a texture map storage means. Multiple texture maps are generated and stored in a modified M/P (multum in pravo—many things in a small space) map form. Even and odd numbered pixels are stored in different memory banks so that adjacent odd and even pixels may be retrieved simultaneously. The MIP maps are stored so that the pages of the MIP maps having the same resolution are stored contiguously. This arrangement has the effect of reducing the number of unique address signals needed for accessing any two adjacent pixels in the texture map and simplifying the generation of texture map pixel addresses.

25 Claims, 8 Drawing Sheets

U.S. PATENT DOCUMENTS

| | | | |
|---|---|---|---|
| 5,157,388 | 10/1992 | Kohn | 345/136 |
| 5,214,753 | 5/1993 | Lee et al. | 395/125 |
| 5,222,204 | 6/1993 | Swanson | 395/127 |
| 5,222,205 | 6/1993 | Larson et al. | 395/130 |
| 5,224,208 | 6/1993 | Miller, Jr. et al. | 395/130 X |
| 5,249,264 | 9/1993 | Matsumoto | 395/134 |
| 5,253,335 | 10/1993 | Mochizuki et al. | 395/122 |
| 5,255,360 | 10/1993 | Peaslee et al. | 395/130 X |
| 5,261,041 | 11/1993 | Susman | 395/119 |
| 5,268,995 | 12/1993 | Diefendorff et al. | 395/122 |
| 5,278,949 | 1/1994 | Thayer | 395/126 |

METHOD AND APPARATUS FOR STORAGE AND RETRIEVAL OF A TEXTURE MAP IN A GRAPHICS DISPLAY SYSTEM

This is a continuation of application Ser. No. 08/051,471, filed Apr. 22, 1993.

BACKGROUND OF THE INVENTION

1. Field of the Invention

The present invention relates to the field of computer generated graphics, in particular, to systems which utilize texture mapping.

2. Prior Art

In computer graphics systems, a known technique for generating pixel shading values is texture mapping. Basically, texture mapping involves mapping predetermined pixel shading values (the texture map) to a surface being rendered. The texture map is typically stored in a random access storage means (e.g. a Dynamic Random Access Memory or DRAM) that is accused by the graphical system during the rendering of a graphical image. This arrangement allows for utilizing different texture maps.

Entries in a texture map are accessed by a (u,v) coordinate system. Pixels on a screen are addressed by (x,y) coordinates. Pixels are associated with entries in the texture map by a functional mapping of the pixels (x,y) coordinates to the (u,v) coordinates of the texture map. Generally, there will be a one to one relationship between the pixels on the display and the entries on the texture maps.

A complication with the use of texture maps is encountered when a graphical system provides for the zooming of images. A zoom operation requires a filtering operation be performed on the values from the texture map in order to obtain an acceptable image. Here, filtering involves the averaging of corresponding pixel values. For example, if the graphical image is to be reduced in size by 4, one pixel in the display would now correspond to 4 pixels in the texture map. The value for the one pixel would be the average of the 4 corresponding pixels. Performing such averaging "on the fly" can be detrimental to rendering speed.

One approach to this problem is to store the texture map as a MIP (Multum In Pravo- many things in a small place) map. MIP maps are described in a paper entitled "Pyramidal Parametrics", by Lance Williams, Computer Graphics, Vol. 17, Number 3, July 1983. In a MIP map, the texture is stored as a series of recursively filtered images, each image being one-quarter of the previous image. Each of the various resolution images are referred to as "pages" of the MIP map. Such a MIP map is illustrated in FIG. 1. A 32×32 image 101 provides the highest resolution in this example. Four texture values $(u_1, v_1)$ 107, $(u_2, v_2)$ 108, $(u_3, v_3)$ 109 and $(u_4, v_4)$ 110 are in the 32×32 image 101. The values 107–109 are averaged to create a value $(u_1', u_2')$ 111 of 16×16 image 102. This occurs for all the texture values in the 32×32 image 101 into the corresponding 16×16 image 102. Similarly, each texture value in 8×8 image 103 is created from four texture values in 16×16 image 102. This repeats for the 4×4 image 104, 2×2 image 105 and 1×1 image 106. It should be noted that the use of MIP maps may not eliminate the need for pixel averaging, but will cause a reduction in the number of averaging operations performed.

The pixels for a given map page are stored contiguously, so the address of pixel (x,y) is M+x* RowSize+y, where M is the offset for the map page, and RowSize is the number of pixels per line in the map page. For a 256×256 MIP map, M follows the sequence $0, 256^2, 256^2+128^2, \ldots, 256^2+128^2+64^2+32^2+16^2+8^2+4^2+2^2$. Frequently, more than one texture map will be utilized to create the desired graphical image. In this case a more generalized version of the address equation becomes pixel (x,y) is T+M+x*RowSize+y, where T is the base address of the MIP map being used. Table 1 shows the resulting memory map when two 256×256 MIP maps are stored contiguously. In Table 1, each MIP map is stored in a contiguous region of memory starting at address T(MapID)=MapID.87381.

TABLE 1

| Memory map for two 256×256 MIP maps | | | |
|---|---|---|---|
| T | M | RowSize | Data |
| 0 | +0 | 256 | Map 0, page 0 (256×256) |
| 0 | +65536 | 128 | Map 0, page 1 (128×128) |
| 0 | +81920 | 64 | Map 0, page 2 (64×64) |
| 0 | +86016 | 32 | Map 0, page 3 (32×32) |
| 0 | +87040 | 16 | Map 0, page 4 (16×16) |
| 0 | +87296 | 8 | Map 0, page 5 (8×8) |
| 0 | +87360 | 4 | Map 0, page 6 (4×4) |
| 0 | +87376 | 2 | Map 0, page 7 (2×2) |
| 0 | +87380 | 1 | Map 0, page 8 (1×1) |
| 87381 | +0 | 256 | Map 1, page 0 (256×256) |
| 87381 | +65536 | 128 | Map 1, page 1 (128×128) |
| 87381 | +81920 | 64 | Map 1, page 2 (64×64) |
| 87381 | +86016 | 32 | Map 1, page 3 (32×32) |
| 87381 | +87040 | 16 | Map 1, page 4 (16×16) |
| 87381 | +87296 | 8 | Map 1, page 5 (8×8) |
| 87381 | +87360 | 4 | Map 1, page 6 (4×4) |
| 87381 | +87376 | 2 | Map 1, page 7 (2×2) |
| 87381 | +87380 | 1 | Map 1, page 8 (1×1) |

During the actual rendering process, the MIP mapping algorithm requires four pixels from each of two adjacent map pages to compute a filtered texture value. In general, a single MIP mapping filter operation requires fetching pixels (n, m) (n, re+1), (n+1,m), and (n+1, m+1) from page p, and pixels (n/2, m/2) (n/2, m/2+1), (n/2+1,m/2), and (n/2+1, m/2+1) from page p+1. Thus, it is desirable to generate pixel addresses and be able to access pixels from the texture map as quickly as possible.

One technique for increasing the rate of retrieving pixel values is to retrieve multiple pixels simultaneously. To retrieve multiple pixels simultaneously from the RAM, it is necessary to partition the data between multiple memory banks such that different pixels are stored in different banks. FIG. 2 shows an example where the RAM is split into two banks, each with 262144/2=131072 pixels. Referring to FIG. 2, bank A 207 stores even pixel addresses and bank B 208 stores odd pixel addresses. With this memory arrangement it is possible to fetch two MIP map pixels simultaneously; for example, the 8 fetches required for performing a filter operation can be grouped into four even/odd address pairs in the pattern {(n,m),(n,m+1)}, {(n+1,m),(n+1,m+1)}, {(n/2,m/2), (n/2,m/2+1)}, {(n/2+1,m/2), (n/2+1,m/2+1)}. This technique allows the 8 pixels to be fetched in four operations, each operation fetching an adjacent pair of pixels with even and odd addresses.

Referring back to FIG. 2, each pixel address, namely pixel (x,y) 201 and pixel (x, y+1) 202 are provided to an address swapping means 203. The address swapping means insures that a pixel address is directed towards the appropriate memory bank. For both addresses, the constant is discarded by a means for discarding low order constant bit, 204 and 205 respectively. Note that the dashed line 206 refers to a physical interface between a rendering component and the texture map storage. For example, the physical interface would be pins on a rendering component and address pins of the DRAMs or SRAMs of the texture map storage. Note that in this case, 34 address signal pins are needed on the rendering component.

The addresses are then provided to the respective memory banks, 207 and 208. The retrieved data is then provided to a data swapping means 209. The data swapping means swaps the data output signals if there was a prior address swap. This insures that the proper data is assigned to the proper pixel address. Finally, the proper pixel (x,y) data 210 and pixel (x, y+1) data 211 is provided. Note that this latter data swapping means may be embodied within the rendering component.

A drawback of this technique is that it requires two complete sets of address signals be generated and implemented. As a rendering component is typically separate from the texture map storage, the rendering components must include an increased number of address lines to connect to the texture map storage. A rendering component may typically be an integrated circuit. Because generating additional address signals raises the cost of the integrated circuit by increasing the number of address pins needed, it would be desirable to use an addressing scheme where the multiple memory banks share address signals.

SUMMARY

A method and apparatus for simultaneous retrieval of multiple pixels from a texture map storage means is disclosed. Texture maps are generated and stored in a modified MIP (multum in pravo—many things in a small space) map form. Even numbered pixels are stored in a first memory bank and odd numbered pixels are stored in a second memory bank. Through this arrangement, adjacent odd and even pixels may be retrieved simultaneously.

The multiple texture maps are not stored contiguously. Instead, the MIP maps are stored so that the pages of the MIP maps having the same resolution are stored contiguously. This arrangement has the effect of reducing the number of unique address signals needed for accessing any two adjacent pixels in the texture map. Significantly, this reduces the number of address pins that would be required on a rendering component accessing the texture map storage. Further, this arrangement simplifies pixel address calculations by eliminating the need to perform addition operations. Address generation may be carried out by simple shift and bitwise logical OR operations. This is because each texture map page has a resolution that is an even power of two.

The method of operation of the present invention is generally comprised of the following steps: grouping corresponding pages of the same resolution for the texture maps to be stored; storing odd pixels in a first memory bank and even pixels in a second memory bank; providing a texture map pixel address to a texture map address signal generation means; splitting the pixel address into an X address signal part and a Y address signal part; adding a one value to the Y address signal part to create a Y+1 address signal part; determining if the pixel address is an odd address or an even address; providing the X address part to the first and second memory banks; if the pixel address is an odd address, providing the Y address signal part to the first memory bank and the Y+1 address signal part to the second memory bank; and if the pixel address is an even address, providing the Y+1 address signal part to the first memory bank and the Y address signal part to the second memory bank.

DETAILED DESCRIPTION OF THE PREFERRED EMBODIMENT

A method and apparatus for simultaneously accessing multiple pixels in a texture map is disclosed. In the following description, numerous specific details are set forth such as the specific rendering implementation, in order to provide a thorough understanding of the present invention. It will be apparent, however, to one skilled in the art that the present invention may be practiced without these specific details. In other instances, well-known circuits, control logic and coding techniques have not been shown in detail in order not to unnecessarily obscure the present invention.

Overview of the Computer System of the Preferred Embodiment

Figure 3:
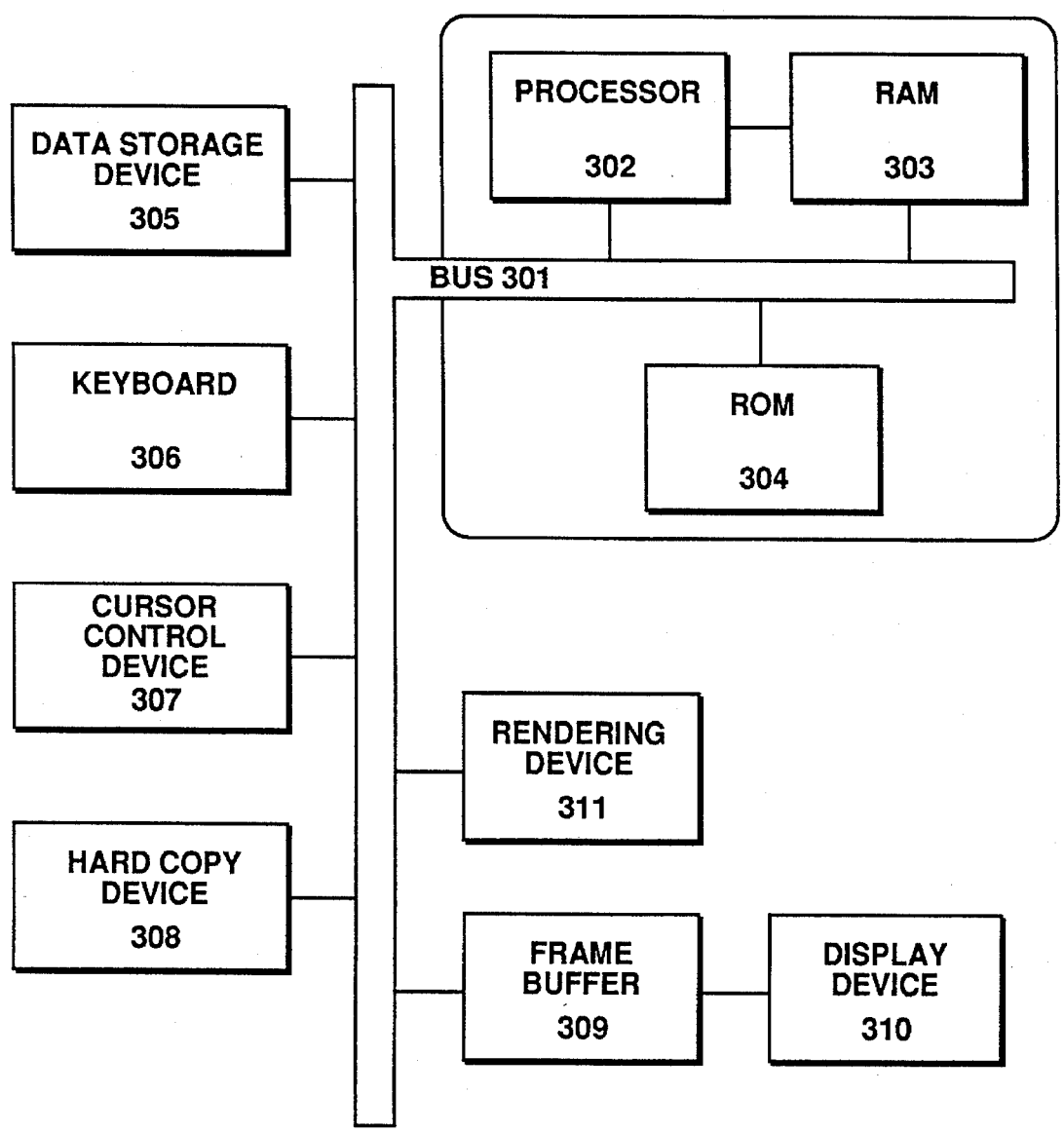
FIG. 3 illustrates a computer system in which the currently preferred embodiment of the present invention may be utilized.

The computer system of the preferred embodiment is described with reference to FIG. 3. The present invention may be implemented on a general purpose microcomputer, such as one of the members of the Apple® Macintosh® family, an IBM compatible Personal Computer, or one of several work-station or graphics computer devices which are presently commercially available. In any event, a computer system as may be utilized by the preferred embodiment generally comprises a bus or other communication means 301 for communicating information, a processing means 302 coupled with said bus 301 for processing information, a random access memory (RAM) or other storage device 303 (commonly referred to as a main memory) coupled with said bus 301 for storing information and instructions for said processor 302, a read only memory (ROM) or other static storage device 304 coupled with said bus 301 for storing static information and instructions for said processor 302, a data storage device 305, such as a magnetic disk and disk drive, coupled with said bus 301 for storing information and instructions, an alphanumeric input device 306 including alphanumeric and other keys coupled to said bus 301 for communicating information and command selections to said processor 302, a cursor control device 307, such as a mouse, track-ball, cursor control keys, etc., coupled to said bus 301 for communicating information and command selections to said processor 302 and for controlling cursor movement. Additionally, it is useful if the system includes a hardcopy device 308, such as a printer, for providing permanent copies of information. The hardcopy device 308 is coupled with the processor 302 through bus 301.

Also coupled to the computer system of the preferred embodiment is a frame buffer 309 which is further coupled to a display device 310, preferably a display device capable of displaying color graphics images. The frame buffer 309 contains the pixel data for driving the display device 310. The display device 310 would be further coupled to a rendering device 311, also known as a graphics accelerator. Typically, such a rendering device 311 is coupled to the bus 301 for communication with the processor 302 and frame buffer 309. The preferred embodiment is implemented for use on models of the Macintosh computer available from Apple Computer, Inc. of Cupertino, Calif.

Figure 4:
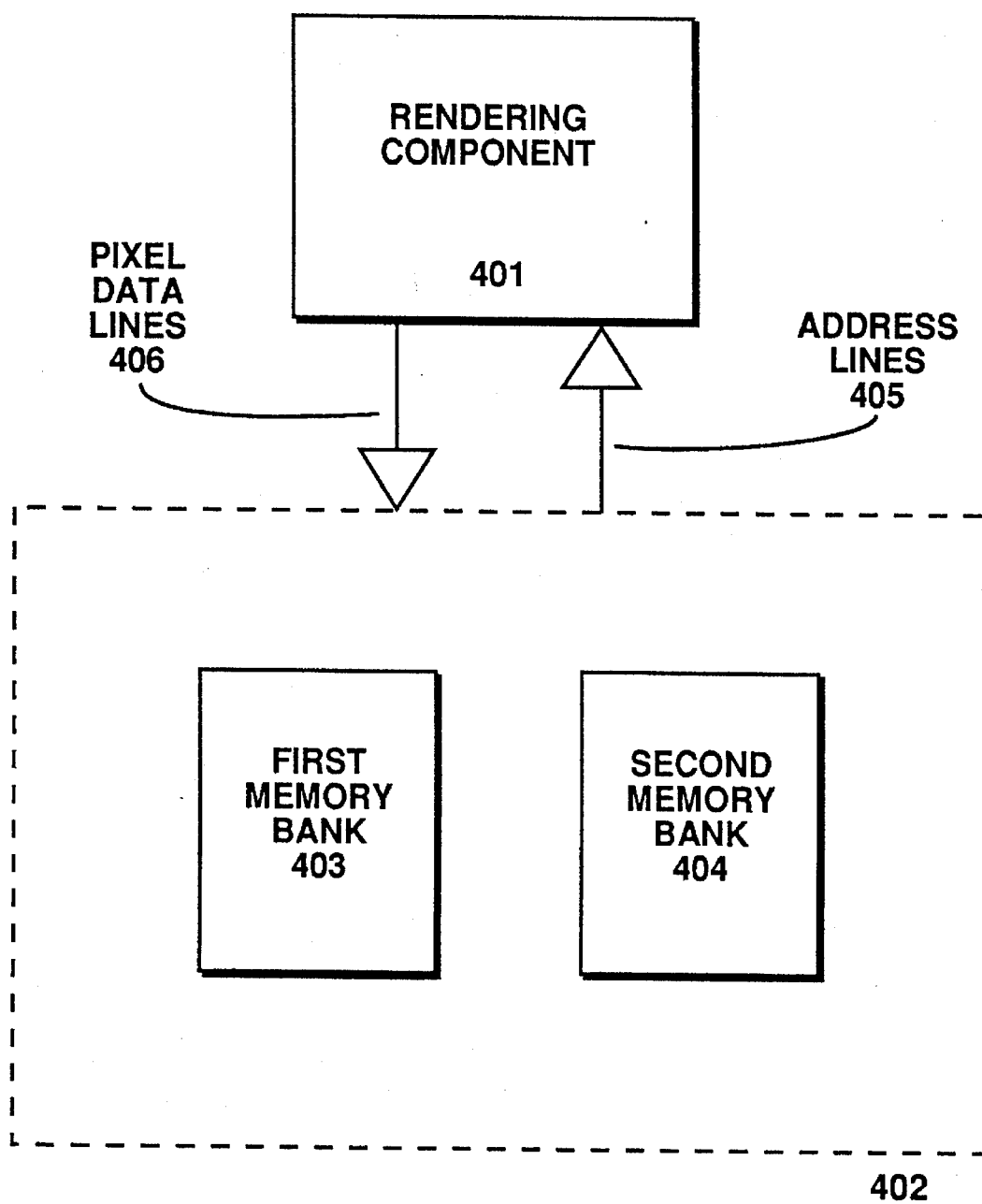
FIG. 4 illustrates the rendering component and texture map storage interface of the currently preferred embodiment of the present invention.

The rendering device interface to a texture map storage is illustrated in FIG. 4. Referring to FIG. 4, a rendering component 401 is coupled to a Texture Storage means 402. In such an arrangement the texture map storage means 402 is typically referred to as being "off-chip". The rendering component 401 performs the actual calculations for generating pixel shading values. The texture storage means 402 may be in some type of Random Access Storage Device, e.g. a Dynamic Random Access Memory (DRAM) or Static Random Access Memory (SRAM). In the currently preferred embodiment an SRAM is utilized because of the high speed in which data may be accessed. In any event, the texture storage means 402 is comprised of a first memory bank 403 and a second memory bank 404. The first memory bank 403 is for storing even numbered pixels and the second memory bank 404 is for storing odd numbered pixels. The rendering component interfaces with the storage means and address lines 405 and pixel data lines 406. In the currently preferred embodiment only 24 address lines are used to access two pixels simultaneously. As will be described in more detail below, a portion of the address is constant between the two pixel addresses.

The pixel data lines 406 is the route by which the pixel values are sent from the texture storage means 402 to the rendering component 401. In the currently preferred embodiment, there are two pixel values being retrieved simultaneously, thus requiring 36 pixel data signals.

Reducing the number of address pins on the rendering component is highly desirable. As a finite number of pins are available on a reasonably sized integrated circuit, freeing use from one function, allows it to be used by another.

Overview of the Rendering Technique of the Currently Preferred Embodiment

In many systems for generating computer graphics, an image to be rendered is comprised of a plurality of objects. The rendering architecture of the preferred embodiment is premised on a scanline algorithm. In the scanline algorithm an image is rendered by scanline. Only the portion of an object on the scanline is rendered. Other rendering techniques render the entire objects at one time. Briefly, one embodiment of the scanline algorithm is a two pass algorithm. The first pass is used to set up databases of information that are used to drive the actual scanline rendering process. In the first pass, a 2-D object is derived from each 3-D object in a 3-D object database. During this process, the scanline upon which the object would first be displayed (first in the sense of the order of drawing scanlines to the display device), i.e. become "active", is determined. This information is used to create an Object Activation Database, where the entries in the database define the objects that become "active" on a particular scanline.

In the second pass, the Object Activation Database is used to create a dynamic list of objects which are "active" on the scanline(s) currently being rendered. This list is called the Active Object List. The Active Object List is then provided to shading means which create the pixel values for the scanline(s) currently being rendered. It is within the shading means that the texture mapping may occur. In any event, the Active Object List is updated as objects become "active" or "inactive" on the scanline(s) to be rendered next.

The scanline rendering technique of the currently preferred embodiment is described in co-pending application Ser. No. 07/811,570, which is commonly assigned to the assignee of the present invention.

It should be noted that the rendering techniques utilized in the currently preferred embodiment is but one example in which the present invention may be utilized. It would be apparent to one skilled in the art to utilize other rendering techniques without departing from the spirit and scope of the present invention.

Organization of the Texture Mapping Storage

To permit some address bits to be shared while reading multiple pixels simultaneously, the texture map storage has been organized so that each map page resolution is stored contiguously, rather than storing each entire MIP map contiguously. This new memory mapping causes all map pages to be aligned to an address that is an even multiple of their RowSize squared.

Table 2 shows the memory map for two 256×256 MIP maps with the address mapping; unlike the mapping shown in Table 1, all map pages are aligned to an address divisible by their page size.

TABLE 2

| Memory map for two 256×256 MIP maps | | | |
|---|---|---|---|
| T | M | RowSize | Data |
| 0 | +0 | 256 | Map 0, page 0 (256×256) |
| 65536 | +0 | 256 | Map 1, page 0 (256×256) |
| 0 | +131072 | 128 | Map 0, page 1 (128×128) |
| 16384 | +131072 | 128 | Map 1, page 1 (128×128) |
| 0 | +163840 | 64 | Map 0, page 2 (64×64) |
| 4096 | +163840 | 64 | Map 1, page 2 (64×64) |
| 0 | +172032 | 32 | Map 0, page 3 (32×32) |
| 1024 | +172032 | 32 | Map 1, page 3 (32×32) |
| 0 | +174080 | 16 | Map 0, page 4 (16×16) |
| 256 | +174080 | 16 | Map 1, page 4 (16×16) |
| 0 | +174592 | 8 | Map 0, page 5 (8×8) |
| 64 | +174592 | 8 | Map 1, page 5 (8×8) |
| 0 | +174720 | 4 | Map 0, page 6 (4×4) |
| 16 | +174720 | 4 | Map 1, page 6 (4×4) |
| 0 | +174752 | 2 | Map 0, page 7 (2×2) |
| 4 | +174752 | 2 | Map 1, page 7 (2×2) |
| 0 | +174760 | 1 | Map 0, page 8 (1×1) |
| 1 | +174760 | 1 | Map 1, page 8 (1×1) |

Storing the MIP map in this manner causes all map pages to be aligned to an even multiple of RowSize$^2$, and therefore to an even multiple of RowSize. Here, the value T is the value of the MapId <<2n (the binary value of MapId shifted by 2n bits), where n=log$_2$ RowSize. This alignment is particularly useful when RowSize is an exact power of two, as the multiplications by RowSize and RowSize$^2$ required for address computation can be replaced by shift operations.

This has the advantage of simplifying the address computation function for pixel (x,y) in map page p such that the bottom n bits, where n=log$_2$ RowSize, is exactly equal to y. Similarly, the next n bits will be exactly equal to x. For example, for map page 1 (128×128) of either map 0 or map 1 in Table 2 above, the A[6:0]=y and A[13:7]=x. Texture maps with resolutions that aren't an even power of two can also be treated this way by expanding them to the appropriate resolution, either by filtering operations or by inserting unreferenced pixels.

Figure 1:
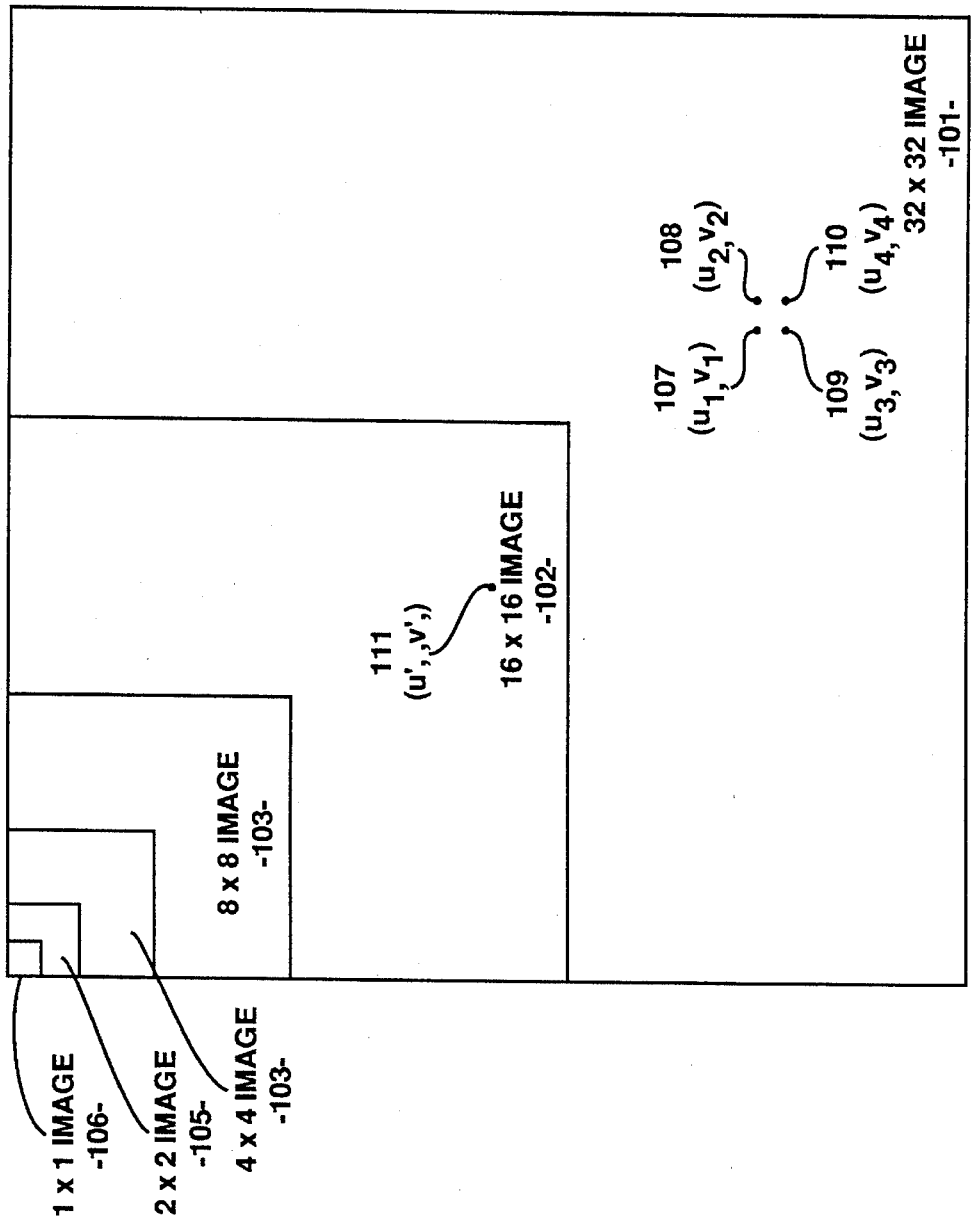
FIG. 1 illustrates the MIP map format of texture maps.
Figure 2:
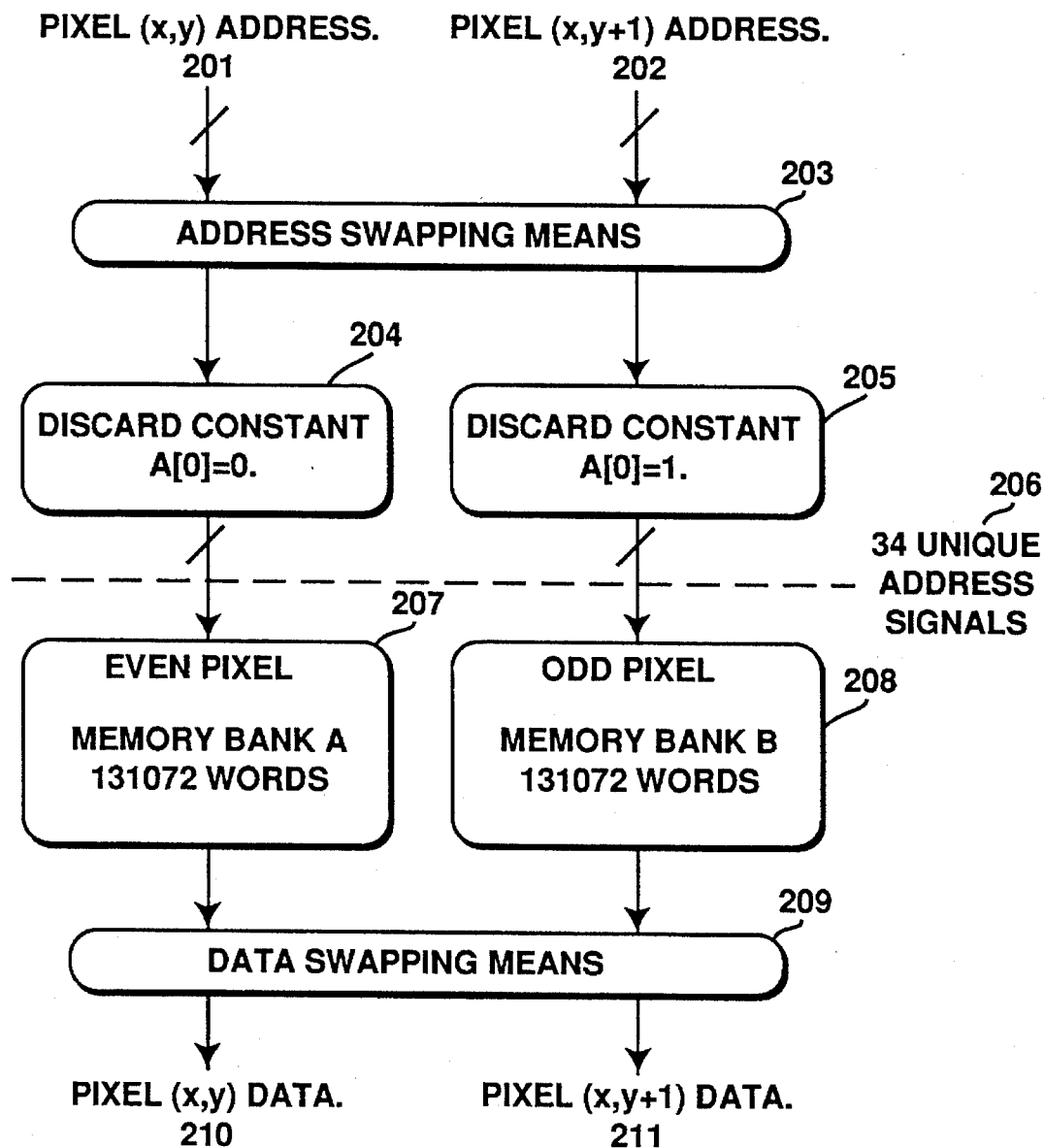
FIG. 2 is a block diagram of a prior art technique for simultaneously accessing multiple pixels from a storage means.

In addition to simplifying address computation, the memory arrangement shown in Table 2 has advantages when designing a circuit that fetches pixel (x,y) and (x,y+1) simultaneously. As shown above, the addresses for pixel (x,y) and (x,y+1) will vary in only the bottom n bits; for example, a fetch from MapPage 1 (128×128 resolution) will share all but the bottom 7 bits (128=2$^7$). As the largest possible RowSize is 256=2$^8$, all address bits more significant than A[7:0] can be shared. This allows pixels (x,y) and (x,y+1) to be addressed with only 1*A[17:8]+2*A[7:1]=24 unique address signals, vs 17+17=34 unique address signals using the conventional memory map illustrated by Table 1 (see also FIG. 2). Also, the +1 operation need only be performed for a maximum of 8 bits, as opposed to the more complex computation required for the Table 1 memory map. The method and circuit for fetching pixel data is described in more detail below. However, it should be noted these figures change for maximum RowSizes other than 2$^8$; however, similar principals apply to obtain the desired result.

Generation of Texture Map Pixel Addresses

As noted above, for performing texture mapping of a single pixel, eight (8) pixel values on the texture map must be retrieved. Four of the pixel values will come from a first page of the texture map and four of the pixel values will come from a second page of the texture map. So it is important that pixel values be fetched in an efficient and timely fashion. Generally, the generation of the pixel address in the texture map is a two step process: generate a pixel address from the given pixel parameters, and generate the simultaneous texture map address signals from the given pixel address.

The addressing of a pixel in the texture map storage may be generally defined by the equation:

$$A=2^n x+y+\text{offset}.$$

This calculation requires addition operations that can prolong rendering time.

The present invention simplifies the calculation of pixel addresses by organizing data to exist in logical powers of 2. In the currently preferred embodiment of the present invention, the organization of the texture maps has the following addressing attributes:

For each A (x,0), the lower order n bits are zero.

For each A (0,y), the lower order n bits are equal to the value of y.

For each A (x,y), the lower order n bits are equal to the value of y and the next n bits are equal to the value of x.

Accordingly, any particular address can be defined by the equation $$A = x \texttt{<<} n \mathbin{|} y \mathbin{|} \text{offset}$$

Here, the symbol "<<" is a bit shift operation and the symbol "|" refers to a bitwise logical OR operation. This provides for the calculation of addresses using simple shift and logical OR operations, rather than arithmetic operations. The formula is now to shift the x parameter by n bits, perform a logical OR operation with the y parameter followed by another logical OR operation with the offset value. Note that this calculation could also be performed by adding the offset to the result of x<<n | y. However it is preferable to perform the bitwise logical OR operation because of inherent performance benefits.

In the currently preferred embodiment, texture mapping is implemented using the parameters x, y, P, and MapID. The parameters x and y are the dimensional coordinates in the texture map. Note that texture map coordinates are sometimes referred to as (u,v) coordinates. The parameter P (Page) refers to the page of the map. The MapID identifies the particular texture map being referenced. These parameters are used to speedy pixel addresses for the texture maps which are stored in the off-chip texture map storage (SRAM). In the currently preferred embodiment, the parameters x and y are n (e.g. eight) bit integers derived from the parameters u and v (which have the format of a 20-bit floating point signed values with 11 bits of fraction and an implied leading 1). P is an unsigned 12-bit floating point value with 4-bits of fraction. The MapID is 4-bits (so in the currently preferred embodiment the maximum number of different texture maps is 16). The implementation of these particular parameters is not meant to be limiting as to the scope of the invention. It would be apparent to one skilled in the art to practice the present invention with different implementations of these parameters.

The circuitry for generation of the texture map pixel address is simplified because of the organization of the MIP maps. This is because the address calculations may be performed by the use of shift registers and logical "OR" operations.

Figure 5A:
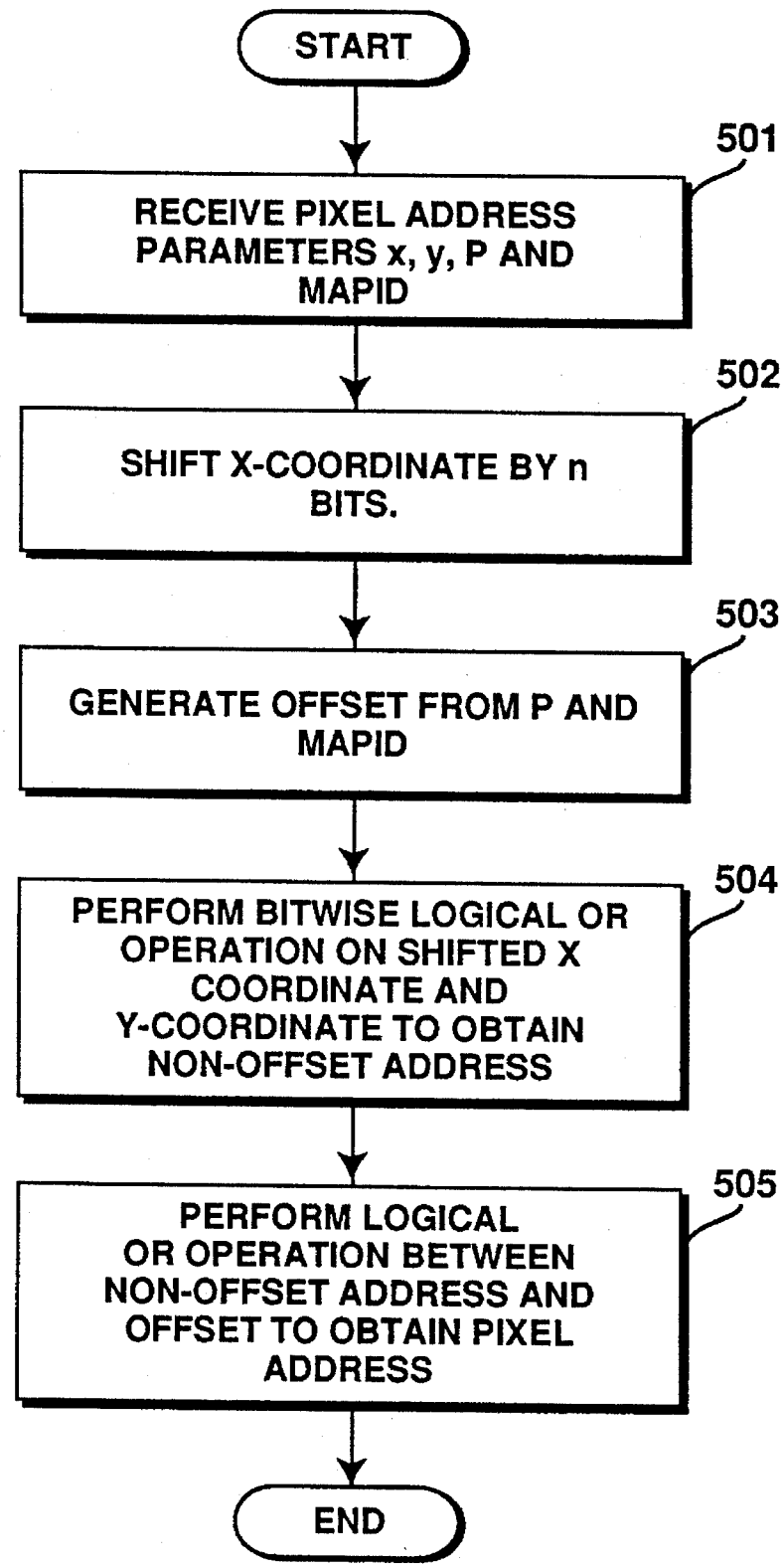
FIG. 5a, is a flowchart outlining the steps for generating a pixel address as may be performed in the currently preferred embodiment of the present invention.

FIG. 5a is a flowchart which outlines the steps for generating a pixel address. Referring to FIG. 5a, the pixel address parameters x, y, P and MapId are received, step 501. The x-coordinate is the shifted by n bits, step 502. The value n refers to the power of 2 of the rowsize of the page being accessed. In other words n=log$_2$ RowSize. For example if the page with resolution 128×128 is being accessed, the value of n is 7 (2$^7$=128). P ranges from 0 to 7 for a map with a maximum resolution of 128×128 and 0 to 8 for a map with a maximum resolution of 256×256. Zero corresponds to the highest resolution version of the source map and 7 or 8 is the lowest resolution (1×1) version. As an example, if the integer portion of P is equal to 3, the map versions corresponding to P equal to 3 and 4 are used.

An offset is then generated from P and the MapId, step 503. The offset corresponds to the location in the texture map where the page is stored for that particular MapId. Calculation of offsets is discussed in more detail below. Once the offset is generated, a bitwise logical OR operation is performed between the shifted x parameter value and the y parameter value to obtain a non-offset address, step 504. Finally, a bitwise logical OR operation is performed between the non-offset address and the offset to obtain the pixel address, step 505.

It is now useful to consider an example of calculating a pixel address. Recall that Table 2 illustrated a pair of texture maps stored in texture map storage and having a "highest" resolution of 256×256. The calculation of the offset is given by the equation OFFSET=M+T; where T=MapId<<2(n-P'), n=log$_2$ (RowSize of the highest resolution page) and P' is the integer portion of P.

M is also calculated based on the highest resolution page. For the case of 256×256 highest resolution the formula for M is $$\sum_{i=0}^{P-1} 2^{2(8-i)+1}$$

for P>0 and 0 for P≦0. In the currently preferred embodiment, since M is fixed, the values are predetermined and stored in a look-up table for access during address generation. The integer portion of P is used as an index into the table.

The various offsets, in decimal and the corresponding binary representation, for addressing texture maps stored as illustrated by Table 2, are listed in Table 3:

TABLE 3

Map/Page Offsets

| | |
|---|---|
| Map 0, Page 0: | 0D = 00000000000000000 |
| Map 1, Page 0: | 65536D = 01000000000000000 |
| Map 0, Page 1: | 131072D = 10000000000000000 |
| Map 1, Page 1: | 147456D = 10010000000000000 |
| Map 0, Page 2: | 163840D = 10100000000000000 |
| Map 1, Page 2: | 167936D = 10100100000000000 |
| Map 0, Page 3: | 172032D = 10101000000000000 |
| Map 1, Page 3: | 173056D = 10101001000000000 |
| Map 0, Page 4: | 174080D = 10101010000000000 |
| Map 1, Page 4: | 174336D = 10101010010000000 |
| Map 0, Page 5: | 174592D = 10101010100000000 |
| Map 1, Page 5: | 174656D = 10101010100100000 |
| Map 0, Page 6: | 174720D = 10101010101000000 |
| Map 1, Page 6: | 174736D = 10101010101010000 |
| Map 0, Page 7: | 174752D = 10101010101010000 |
| Map 1, Page 7: | 174756D = 10101010101010100 |
| Map 0, Page 8: | 174760D = 10101010101010100 |
| Map 1, Page 8: | 174761D = 10101010101010001 |

Assume a pixel at location (21, 3) on page 2 of texture map 1 is to be fetched. The texture map address would be calculated as follows:

x coordinate=21=00010101
y coordinate=3=00000011
n=the number of bits need to represent 64=6
offset=Map 1, Page 2:167936D=10100100000000000

Shifting x by n results in 000000010101000000. Performing a bitwise logical OR with y results in 000010101000011. The final pixel address is generated by performing a bitwise logical OR operation with the offset associated with the desired page and texture map. Performing the bitwise logical OR operation with the offset results in 101001010101000011.

Figure 5B:
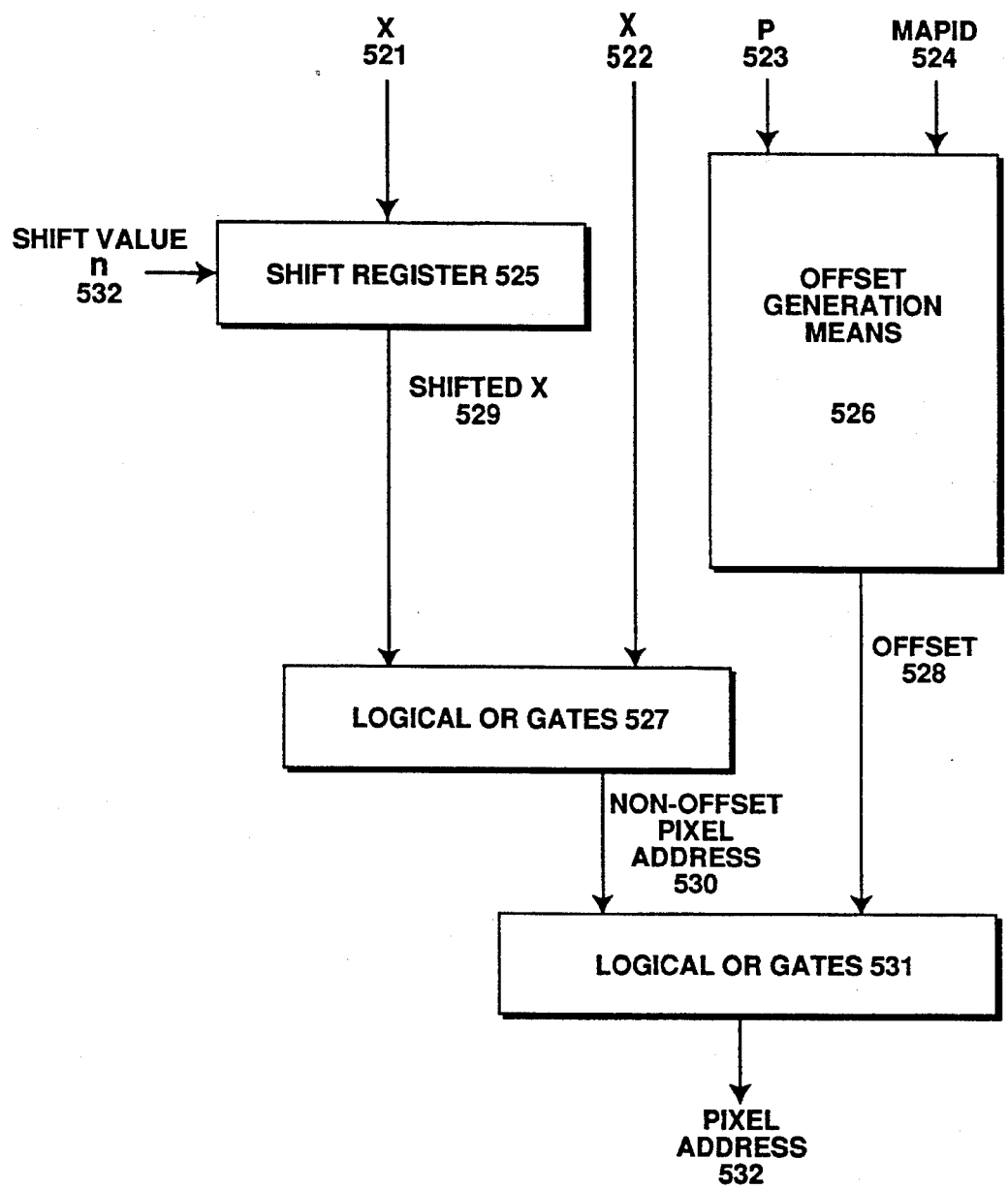
FIG. 5b is a block diagram of a circuit for generating pixel addresses as may be utilized by the currently preferred embodiment of the present invention.

FIG. 5b illustrates in block diagram for a circuit for generating a pixel address. A parameter x 521 is provided as input and entered into a shift register 525. The parameter x 521 is left (up) shifted for a number of bits provided by shift value n 532. The shift value n 532 is derived from the formula n=8−integer portion of P. The result is a shifted x 529. The shifted x 529 is coupled to bitwise logical OR gates 527. The bitwise logical OR gates 527 would be an array of two-input OR gates. Each bit of the shifted x 529 would be coupled to one of. the inputs of a two input OR gates of bitwise logical OR gates 527. The other input would be connected to corresponding bits of y parameter 599. The result of performing this function would be non-offset pixel address 530.

Parameters P 523 and MapId 524 are coupled to an offset generation means 526. The offset generation means 526 will generate the necessary offset by adding M+T. M is obtained through a table look-up and T=MapId<<2(n−P') (see discussion on offset generation above). In any event, the output of offset generation means 526 will be offset 528. Each bit of the offset 528 will be coupled to one of the inputs of two input OR gates embodied in bitwise logical OR gates 531. The other input will come from corresponding bits of the non-offset pixel address 530. The output of the bitwise logical OR gates 531 is the desired pixel address 532.

Address Signals Generation

Figure 6:
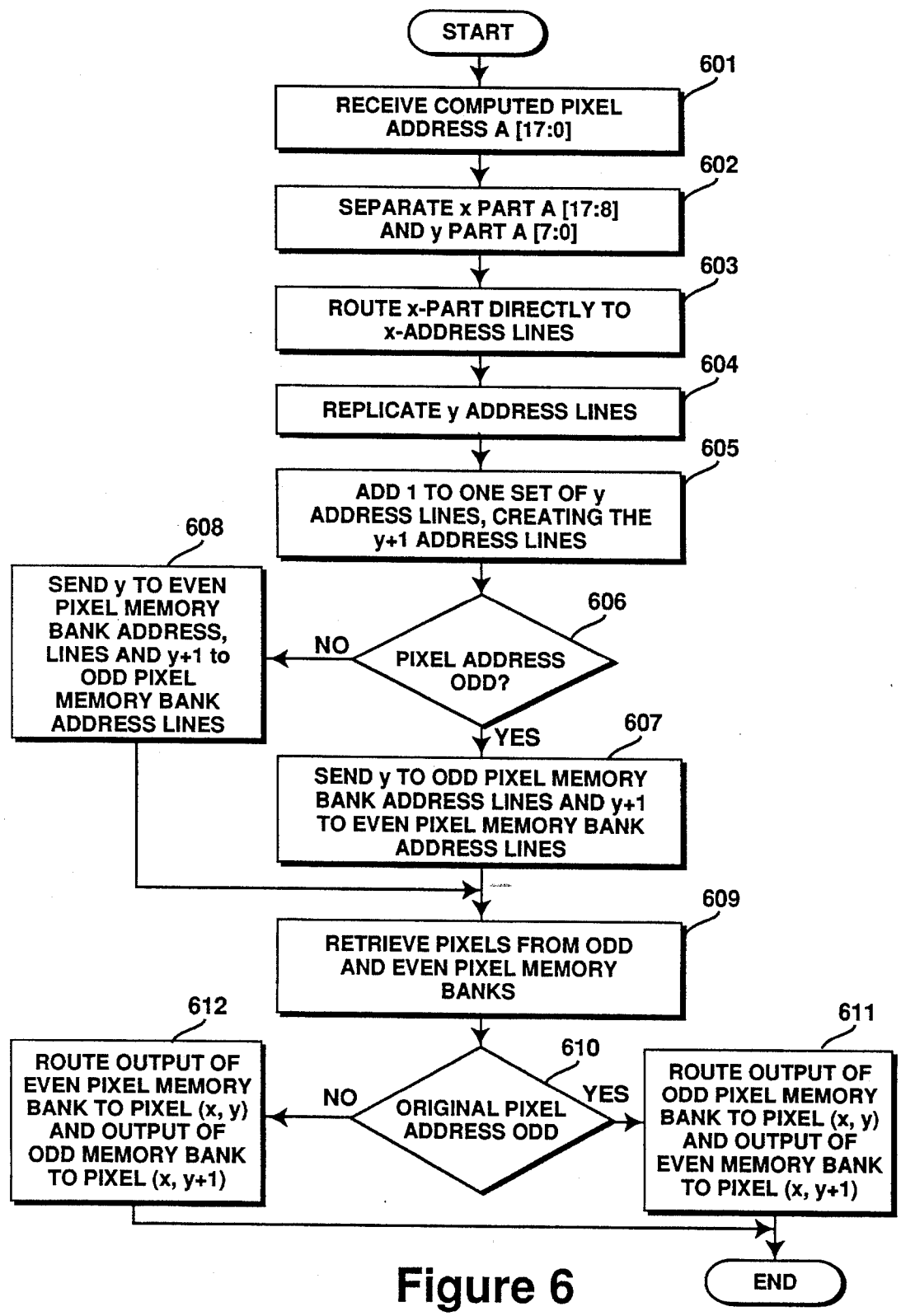
FIG. 6 is a flowchart outlining the steps for generating two texture map address signals as may be performed on the currently preferred embodiment of the present invention.

FIG. 6 is a flowchart illustrating the steps for generating the address signals for simultaneous access of pixels. First, the computed pixel address is received, step 601. In the currently preferred embodiment, there are 18 address signals which are referred to as A[17:0]. For the notation A[17:0], "A" refers to "address" and a bit range of the address is within the square brackets. Once the address signal is received, it is split into an x part A[17:8] and a y part A[7:0], step 602. The x part A [17:8] is routed directly to pins of the rendering component, so as to comprise x address lines, step 603. This is because the high order bits A[17:8] do not change for each of the texture map address to be accessed.

Next, the y part is replicated to create a second set of low order address bits, called y+1, step 604. A one is added to y+1 to create the second adjacent pixel address that will be accessed, step 605. Note that for the given maximum resolution of 256×256, the low order bits will never exceed the number represented by the maximum rowsize 28 (256). It is then determined if the originally provided pixel address is odd, step 606. This must be determined in order to send the proper address to the respective even and odd pixel memory banks of the texture map storage means. Determining if a pixel address is even or odd is merely a determination of whether the lowest order bit is a one or a zero.

If the pixel address is odd, the y address lines are sent to the odd pixel bank and the y+1 address lines are sent to the even pixel bank, step 607. Conversely, if the pixel address is even, the y+1 address lines are sent to the odd pixel bank and the y address lines are sent to the even pixel bank, step 608.

The pixels are then retrieved from the odd and even pixel memory banks, step 609. A check is again made to determine which of the original pixel address was odd, Step 610. This step is to insure that the pixel values are being provided to the right pixels. If the original pixel address was odd, the output of the odd pixel memory bank is routed to the original pixel address P(x,y) and the output of the even pixel memory bank is routed to the adjacent pixel address P(x,y +1), step 611. Similarly, if the original pixel address was even, the output of the even pixel memory bank is routed to the original pixel address P(x,y) and the output of the odd pixel memory bank is routed to the adjacent pixel address P(x,y+ 1), Step 612.

Figure 7:
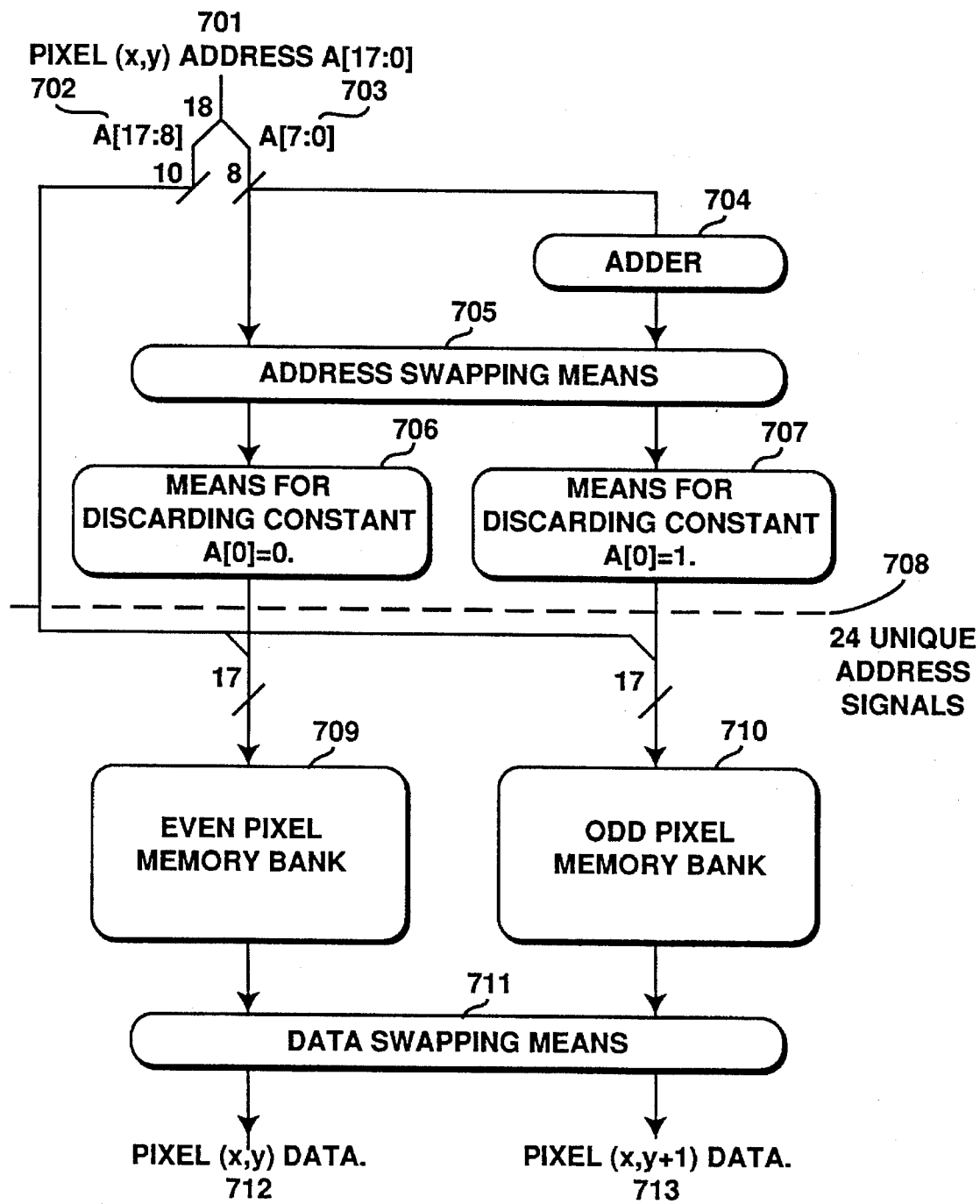
FIG. 7 is a block diagram describing the circuitry for generating address signals as may be utilized in the currently preferred embodiment of the present invention.

The generation of the texture map address signals is further described with reference to FIG. 7. Referring to FIG. 7, the pixel address lines 701 are split into A[17:8] 702 and A[7:0] 703. Note that the dashed line 708 refers to a boundary of a rendering component. Anything above the line 708 would be within the rendering component.

The address signals A[7:0] 703 are then routed to an address swapping means 705 and an adder 704. In the adder 704, a one is added to the contents of the address signals A[7:0] to create the second adjacent address to be retrieved from the texture map storage. The address swapping means 705 is used to determine if the original pixel address from the lines A[7:0] represent an odd pixel. If it was odd, the address signals are swapped in order to send the proper low order bits to the proper pixel memory bank. Once the signals are directed towards the proper memory bank, the constant low order bits are discarded by means 706 and 707, respectively. This has the further effect of dividing the address value by 2. This is necessary since the pixel address storage is comprised of two memory banks.

The texture map storage is comprised of even pixel memory bank 709 and odd pixel memory bank 710. The even address signals are then routed to even pixel memory bank 709 while the odd address signals are routed to odd pixel memory bank 710. As described above, the memory banks 709 and 710 are preferably SRAM devices. Finally, the retrieved data from the memory banks 709 and 710 then provided to a data swapping means 711. The data swapping means 711 will swap the data if an address swap was previously performed. This will insure that the proper pixel data is sent as pixel (x,y) data 712 and pixel (x, y+1) data 713. The data swapping means 711 would typically reside in the rendering component.

Further with reference to FIG. 7, note that only 24 pins are needed on the rendering component for simultaneously addressing two pixels on the texture map storage means, even though each pixel address is 18 bits long (for a total of 36 bits). The high order ten pins are provided to each memory bank 709 and 710. The low order bit for each address is discarded for these purposes. This results in a savings of 12 pins on the rendering component. Note that the number of pins being saved is dependent on the largest texture map resolution supported. It would be apparent to one skilled in the art to provide a system with a higher or lower resolution texture maps without departing from the spirit and scope of the present invention.

Thus, a method and apparatus for simultaneous retrieval of multiple pixels from a texture map storage means is disclosed.

We claim:

1. In a computer controlled display system, a method for storing and accessing a plurality of modified MIP mapped texture maps, said method comprising the steps of:

a) storing corresponding pages of a first texture map and a second texture map so that said corresponding pages of said first and said second texture map are stored contiguously;

b) storing even pixels of said first and second texture maps in a first memory bank;

c) storing odd pixels of said first and second texture maps in a second memory bank;

d) providing a pixel address, said pixel address including an X part and a Y part;

e) adding a one value to said Y part to create a Y+1 part;

f) determining if said pixel address is an odd address or an even address;

g) providing said X part to said first memory bank and said second memory bank;

h) if said pixel address is an odd address, providing said Y+1 pan to said first memory bank and said Y part to said second memory bank; and i) if said pixel address is an even address, providing said Y part to said first memory bank and said Y+1 pan to said second memory bank.

2. The method as recited in claim 7 wherein said first and second texture maps have a resolution of N x N and said step of providing said pixel address is further comprised of the steps of:

a) receiving a first coordinate and a second coordinate for a pixel in a texture map;

b) shifting said first coordinate by n bits to generate said X part, wherein n is equal to $\log_2 N$;

c. using said second coordinate as said Y part: and d) combining said X part with said Y part to form said pixel address.

3. The method as recited in claim 2 wherein said step of combining said X part with said Y part is further comprised of the step performing a logical OR operation between said X part and said Y part to form said pixel address.

4. The method as recited in claim 3 further comprising the steps of:

a) providing an offset value, said offset value corresponding to a predetermined texture map and a predetermined page;

b) performing a logical OR operation between said pixel address and said offset value to form an offset pixel address; and c) providing said offset pixel address as said pixel address.

5. The method of claim 4 wherein said offset value is formed by summing the product of a total number of said corresponding pages and a page size for each of said corresponding pages for each said texture map preceding said predetermined page, and a number of said corresponding pages and said page size for each of said corresponding pages for each said texture map preceding said predetermined texture map within said predetermined page.

6. The method of claim 4 wherein said offset value is formed by summing an M value and a T value, said T value being obtained from a map identifier for said predetermined texture map and a highest resolution page, and said M value being obtained from a page identifier of said predetermined page and said highest resolution page.

7. The method of claim 6 wherein said T value is equal to said map identifier shifted by a first value, said first value being a product of two and a difference of n and said page identifier.

8. The method of claim 6 wherein said M value is equal to a sum of all of the products of a number of said texture maps and the size of said corresponding pages of each of said texture maps.

9. The method of claim 8 wherein said M value is determined by performing a lookup in a lookup table using said page identifier and said highest resolution page.

10. The method of claim 6 wherein said M value is determined by performing a lookup in a lookup table using said page identifier and said highest resolution page.

11. A rendering component in combination with a storage means, said storage means for storing a plurality of texture maps, said plurality of texture maps including a first texture map and a second texture map, said rendering component comprised of:

a first set of address conductors for providing the high order bits of a first and a second pixel address in said storage means;

a second set of address conductors for providing the low order bits of said first pixel address in said storage means;

a third set of address conductors for providing the low order bits of said second pixel address in said storage means; and said storage means for storing said texture maps in modified MIP map form so that corresponding pages of said first and second texture maps are stored contiguously, said storage means further comprising:

a first memory bank for storing even pixels of said first and second texture maps, said first memory bank coupled to receive addresses from said first and second sets of address conductors;

a second memory bank for storing odd pixels of said first and second texture maps, said second memory bank coupled to receive addresses from said first and third sets of address conductors.

12. The combination as recited in claim 11 wherein said rendering component is further comprised of means for causing said first pixel address to be an even address.

13. The combination as recited in claim 12 wherein said means for causing said first pixel address to be an even address is further comprised of:
  means for determining if said first pixel address is an odd address; and
  means for swapping said first pixel address with said second pixel address if said first pixel address is an odd address.

14. A computer system having a texture map circuit, said texture map circuit comprising:
  a memory operative to store a plurality of texture maps, said memory having an N bit address input, each texture map of said plurality of texture maps being in modified MIP map form, said memory operative to store corresponding pages between said plurality of texture maps at contiguous memory addresses;
  an address circuit having a pixel address input and an address output, wherein said address output is coupled to said address input, said address output operative to output L addresses responsive to receiving a pixel identifier for said address input and said pixel address input.

15. The computer system of claim 14 wherein said pixel identifier includes a texture map indicator, a page indicator, an x value and a y value, said address circuit further comprises:
  a shift circuit coupled to receive said x value and an n value, where said n value corresponds to a size of a row of pixels in a texture map corresponding to said texture map indicator, said shift circuit having a shifted x output, said shifted x corresponding to said x value being shifted by said n value;
  a combining circuit coupled to receive said y value and said shifted x, said combining circuit having a non-offset address output, said non-offset address corresponding to said y value being combined with said shifted x;
  an offset generation circuit coupled to receive said texture map indicator and said page indicator, said offset generation circuit having an offset output, said offset corresponding to said texture map indicator and said page indicator; and
  a second combining circuit coupled to receive said non-offset address and said offset, said second combining circuit having an address output, said address output for outputting one address of said L addresses, said one address corresponding to said non-offset address being combined with said offset.

16. The computer system of claim 15 wherein said shift circuit includes a shift register.

17. The computer system of claim 15 wherein said combining circuit includes a first plurality of logical OR circuits, and said second combining circuit includes a second plurality of logical OR circuits.

18. The computer system of claim 15 wherein n equals the log base two of said size.

19. The computer system of claim 15 wherein said page indicator includes a real number and wherein said page indicator corresponds to a first page having a next greater resolution than said page indicator and said page indicator corresponds to a second page having a next less than or equal to resolution than said page indicator.

20. A circuit having a texture map pixel output and a pixel address input, said circuit comprising:
  a memory, said memory operative to store a first texture map and a second texture map, said first texture map including a first N×N page and a first N/M×N/M page, said second texture map including a second N×N page and a second N/M×N/M page, said first N×N page and said second N×N page being stored contiguously, said first N/M×N/M page and said second N/M×N/M page being stored contiguously, said memory having a pixel output; and
  a circuit having an address output, said address output being coupled to said memory, said address output operative to communicate a plurality of addresses to said memory in response to receiving said pixel address.

21. The circuit of claim 20 wherein N and M are integers greater than 1 and wherein M is less than N.

22. A method in a computer-controlled display system comprising the following steps:
  a) receiving a plurality of texture maps, each of said plurality of texture maps comprised of pages each having different resolutions;
  b) storing corresponding pages of each of said plurality of said texture maps contiguously into groups of corresponding pages of each of said plurality of said texture maps;
  c) storing each of said groups of said corresponding pages of each of said plurality of said texture maps contiguously to form a texture map store; and
  d) using said texture map store to perform texture mapping of images.

23. The method of claim 22 wherein said step of storing each of said groups of said corresponding pages of each of said plurality of said texture maps includes storing a first group of said corresponding pages of said texture maps which includes a highest resolution of said corresponding pages of said plurality of said texture :maps and storing a last group of said corresponding pages of each of said plurality of said texture maps which includes a lowest resolution of said corresponding pages of said texture maps.

24. The method of claim 22 wherein said step of using said texture map store to perform texture mapping of images includes the step of accessing a desired pixel of a desired page of a desired texture map by:
  a) receiving a pixel identifier, a page identifier, and a texture map identifier;
  b) determining a texture map location by shifting said texture map identifier a first number of bits, wherein said first number of bits includes the number of bits which comprise said pixel identifier;
  c) determining a page location by summing a size of each of said groups of pages preceding a group of pages of said texture maps which includes said desired page;
  d) summing said page location with said texture map location to generate an offset;
  e) performing a bitwise logical or operation between said offset and said pixel identifier to generate an address; and
  f) accessing said desired pixel of said desired page of said desired texture map at said address in said texture map store.

25. The method of claim 24 wherein said step of receiving said pixel identifier includes:
  a) receiving an x coordinate and a y coordinate;
  b) shifting said x coordinate by a second number of bits to generate a shifted x coordinate, said second number of bits being a number of bits which comprise said y coordinate; and
  c) performing a bitwise logical OR between said shifted x coordinate and said y coordinate to generate said pixel identifier.

* * * * *

UNITED STATES PATENT AND TRADEMARK OFFICE
CERTIFICATE OF CORRECTION

PATENT NO. : 5,606,650
DATED : February 25, 1997
INVENTOR(S) : Kelley et al.

It is certified that error appears in the above-identified patent and that said Letters Patent is hereby corrected as shown below:

In the claims:

Claim 1, column 11, line 52, "pan" should read --part--
Claim 1, column 11, line 55, "pan" should read --part--
Claim 2, column 11, line 57, "claim 7" should read --claim 1--
Claim 2, column 11, line 65, "c. using" should read --c ) using--
Claim 23, column 14, line 31, "texture :maps" should read --texture maps--

Signed and Sealed this

Third Day of August, 1999

Attest:

Q. TODD DICKINSON

*Attesting Officer*     *Acting Commissioner of Patents and Trademarks*